United States Patent
Lee

[11] Patent Number: 6,128,432
[45] Date of Patent: Oct. 3, 2000

[54] METHOD FOR REPRODUCING DATA RECORDED AT MULTIPLE ANGLES ON A RECORDING MEDIUM

[75] Inventor: Cheon-seong Lee, Suwon, Rep. of Korea

[73] Assignee: Samsung Electronics Co., Ltd., Kyungki-Do, Rep. of Korea

[21] Appl. No.: 08/866,026

[22] Filed: May 30, 1997

[30] Foreign Application Priority Data

May 30, 1996 [KR]   Rep. of Korea ...................... 96-18761

[51] Int. Cl.[7] .............................. H04N 5/781; H04N 5/83
[52] U.S. Cl. ................................. 386/70; 386/55
[58] Field of Search ........................... 386/70, 124, 125, 386/46, 83, 1, 52, 55; 360/32; H04N 5/781, 5/83

[56] References Cited

U.S. PATENT DOCUMENTS 5,819,003  10/1998  Hirayama et al. ......................... 386/95
5,848,216  12/1998  Kaneshige .................................. 386/46

*Primary Examiner*—Robert Chevalier
*Attorney, Agent, or Firm*—Sughrue, Mion, Zinn, Macpeak & Seas, PLLC

[57] ABSTRACT

In a multiple angle reproduction method for reproducing a picture recorded at multiple angles in a recording medium, which is a digital video disk in a preferred embodiment of the present invention, it is determined whether an instruction for a multiple angle reproduction mode is input. Then, data recorded on the recording medium at first angle is reproduced. If an instruction for multiple angle reproduction was input, a second angle is sequentially changed and a data of the second angle is reproduced.

10 Claims, 2 Drawing Sheets

METHOD FOR REPRODUCING DATA RECORDED AT MULTIPLE ANGLES ON A RECORDING MEDIUM

BACKGROUND OF THE INVENTION

1. Field of the Invention

The present invention relates to a reproduction method for a recording medium having video data, and more particularly, to a method for reproducing a recording medium in which video data captured at multiple angles are recorded.

2. Description of the Related Arts

In general, a digital video disk (DVD) contains, in some data blocks, video data of an object which were captured at a plurality of angles. When such a DVD is played back in a DVD player, the user initially selects an angle from the plurality of angles, and the data which was recorded at the selected angle is reproduced.

Thus, when playing back a digital video disk having multiple angle data, the user can watch just a single picture of an angle which was selected before the reproducing operation. To watch pictures captured at another angle, a new reproduction angle must be selected and the DVD must be played back from the beginning. Therefore, much manipulation is required for watching pictures captured at multiple angles, which causes some inconvenience.

SUMMARY OF THE INVENTION

To solve the above problem, the object of the present invention is to provide a method of reproducing data recorded on a recording medium at multiple angles. The method automatically reproduces sequentially pictures recorded at each angle by searching for a block recorded at multiple angles after reproduction is completed at an initially selected angle.

To achieve the above object, there is provided a multiple angle reproduction method for reproducing a picture data of multiple angles in a recording medium, comprising the steps of: (a) determining whether an instruction for a multiple angle reproduction mode is input; (b) reproducing a data of a first angle recorded in the recording medium; and (c) sequentially changing a second angle and reproducing a data of the second angle if it is determined that the instruction for the multiple angle reproduction mode is input in the step (a).

It is preferable that the step (c) comprises the steps of: (c1) setting one of the multiple angles other than the first angle as the second angle; (c2) determining whether the reproduction was completed for all of the multiple angles; (c3) searching for a data block of the second angle if it is not determined that the reproduction was completed for all of the multiple angles in the step (c2); (c4) reproducing the data block of the second angle; and (c5) changing the second angle by another angle when the reproduction of the data block of the second angle is completed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 2:
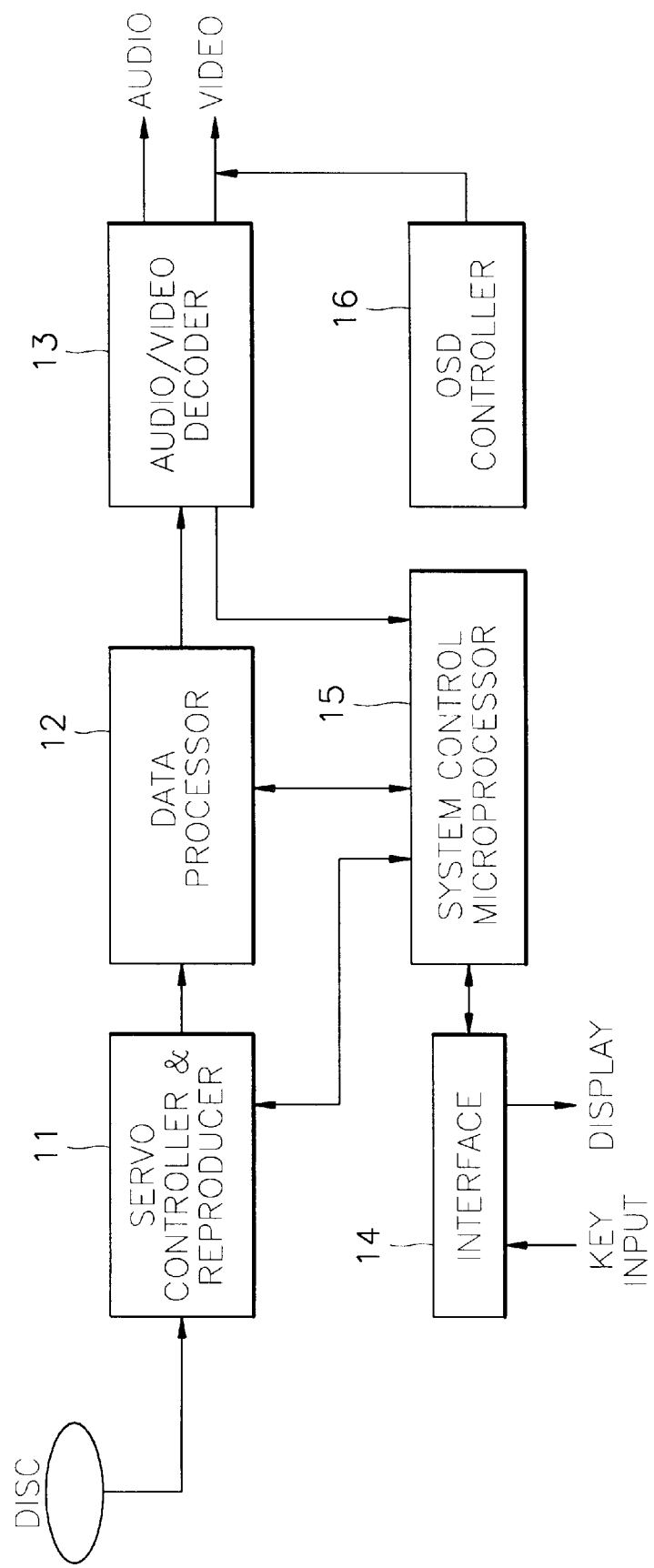
FIG. 2 is a block diagram of a typical digital video disk player to which the reproduction method of the present invention is applied.

FIG. 2 shows a typical digital video disk (DVD) player.

In the DVD player of FIG. 2, a servo controller and reproducer 11 actuates a plurality of servos in the DVD player, which servos include a focus servo, a tracking servo, and a spindle servo. Also, the servo controller and reproducer 11 reads out the signal recorded on a disk and carries out sampling of the read-out signal to output an Eight-to-Fourteen-Modulated or an Eight-to-Fifteen-Modulated (EFM) data.

A data processor 12 demodulates the EFM data output by the servo controller and reproducer 11 and error-correction-decodes the demodulated data. Afterwards, the data processor 12 stores the decoded data in its internal buffer to output the stored data to an audio/video decoder 13 in accordance with a control signal from a system control microprocessor 15.

The audio/video decoder 13 decodes the data from the data processor 12 into audio data and video data.

An interface 14 receives a key input from a key panel in front of the player or a remote controller. Subsequently, the interface 14 drives a display device such as an FLT, to display the key input information. Also, the interface 14 outputs the key input information to the system control microprocessor 15.

The system control microprocessor 15 controls the overall operations in accordance with the key input information from the interface 14.

An OSD controller 16 displays a reproduced video signal and other information on a display such as a cathode ray tube device.

Figure 1:
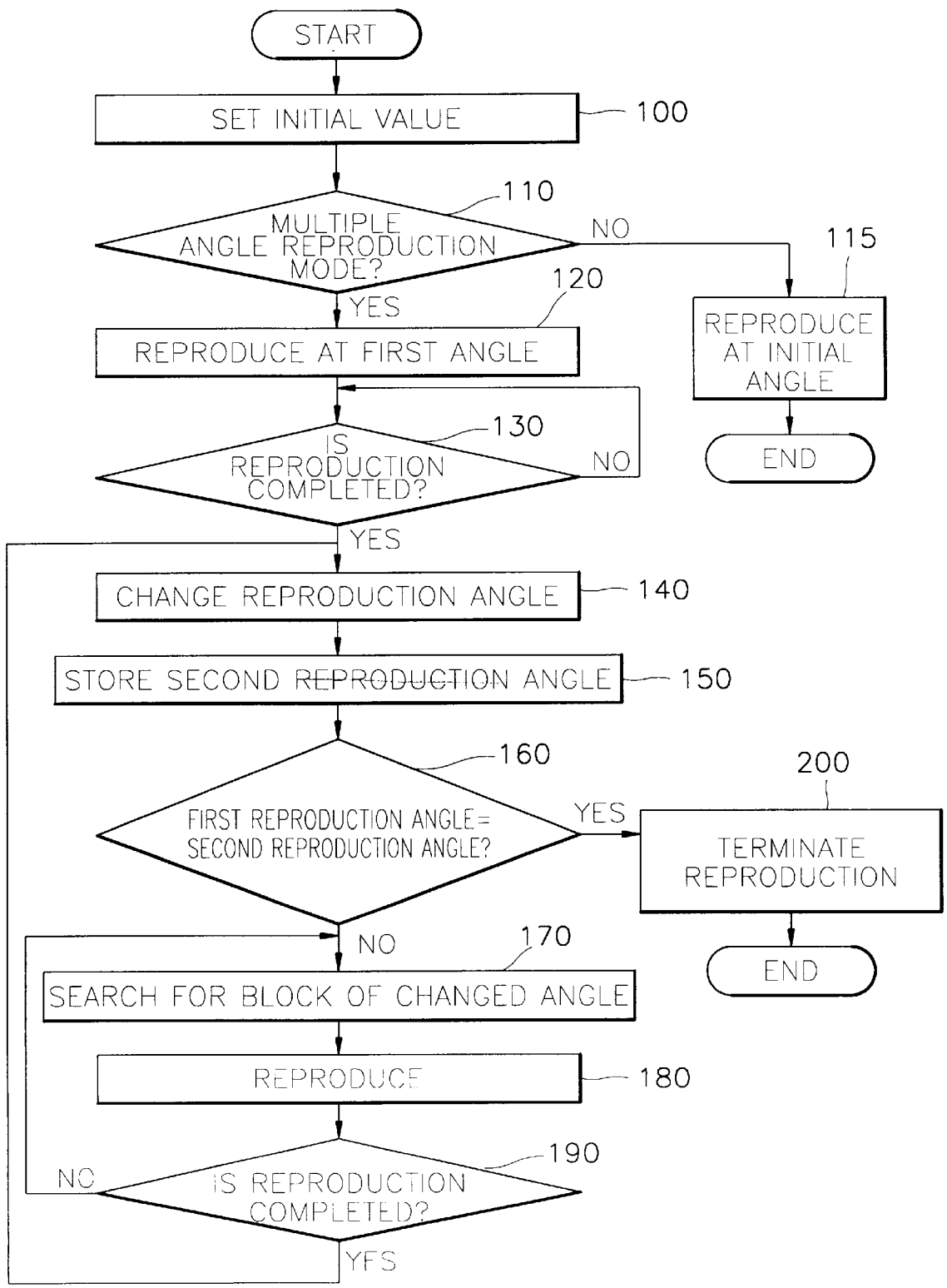
FIG. 1 is a flowchart illustrating the method for reproducing a digital video disk having data captured at multiple angles according to the present invention.

FIG. 1 is a flowchart for illustrating an embodiment of the method for reproducing a DVD according to the present invention. The embodiment of FIG. 1 will now be described with reference to FIG. 2.

The method shown in FIG. 2 generally includes a step 100 of setting initial values of a reproduction mode and a preferred reproduction angle, steps 110, 120, 130 and 115 of reproducing a DVD at the preferred angle, and steps 140 through 200 of changing the reproduction angle sequentially and reproducing the DVD at the changed angle if the reproduction mode is a multiple angle mode.

First, in reproducing a DVD with an apparatus as shown in FIG. 2, a reproduction mode is set along with a preferred angle sequence or a preferred angle in step 100 by the user by using a key panel on the player or the remote controller.

In this embodiment, there are two kinds of reproduction modes: a multiple angle mode and a single angle mode. Here, the multiple angle mode refers to a mode in which the data of an angle recorded on the disk is reproduced, and then the multiple angle data block is searched to be sequentially reproduced. On the other hand, the single angle mode refers to a mode in which the data of only a single angle is reproduced.

In step 100, the preferred angle sequence is set by the user in the case that the multiple angle mode is chosen, while a single preferred angle is set in the case that the single angle mode is chosen. If there is no input for the preferred angle sequence or the preferred angle is not set, a default angle sequence or an angle may be designated.

Meanwhile, the system control microprocessor 15 shown in FIG. 2 may determine whether only data of a single angle is recorded in the DVD before the setting of the reproduction mode and display information indicating that only data of a single angle is recorded in the recording medium.

Afterwards, a determination is made as to whether or not the reproduction mode is the multiple angle mode (step 110). If it is determined that the reproduction mode is not the multiple angle mode in step 110, the DVD is reproduced in the single angle mode in step 115, and the reproduction procedure is terminated.

On the other hand, if it is determined in step 110 that the reproduction mode is the multiple angle mode, then in step 120 the DVD is reproduced at the first reproduction angle of the desired angle sequence which was set in step 100.

At this time, information indicating that the reproduction mode is the multiple angle mode may be displayed on the screen.

In step 130, it is determined whether reproduction is completed to the end of the recording medium. If the reproduction is completed to the end of the recording medium, the current reproduction angle is changed into another angle in step 140 according to the desired angle sequence determined in the step 100.

The changed angle in step 140 is stored as a second reproduction angle in step 150 and compared with the first reproduction angle in step 160.

Since the reproduction angle is changed cyclically in step 140, the second angle will be the same as the first angle when the reproduction is completed for all angles. Therefore, if the first reproduction angle is the same as the second reproduction angle in step 160, the reproduction is terminated in step 200.

Meanwhile, if the first reproduction angle is not the same as the second reproduction angle in step 160, data blocks containing data recorded at the second reproduction angle are searched in step 170 to reproduce the searched data in step 180.

Generally, only some of the data blocks in the DVD rather than all of the data blocks are recorded at multiple angles. Therefore, data blocks recorded at a single angle are skipped and only blocks having data recorded at the changed angle are searched for. Then, the data recorded at the changed angle are reproduced.

Also, in the present embodiment, the number of times the reproduction angle is changed is counted and displayed along with the total number of the angles on the screen, while the step 180 or 190 is being carried out, in order to provide the user with information regarding the number of times the angle has changed. Such information is displayed only for a predetermined time at an early stage of the reproduction.

Meanwhile, in step 190, a determination is made as to whether the reproduction of the block recorded at the changed angle is completed. If the reproduction is not completed, the steps 170 and 180 are performed again. However, if the reproduction is completed, the procedure returns to the step 140.

As described above, the single angle portion and the multiple angle portions of the recording medium are reproduced first at the initially set reproduction angle, and then blocks recorded at multiple angles are searched for while the reproduction angle is sequentially changed. Therefore, a user can watch pictures of every angle at which the data is recorded in the recording medium. Furthermore, reproduction time can be saved since only the portion recorded at multiple angles is searched for to be reproduced.

The previous description of the preferred embodiment is provided to exemplify the present invention. Moreover, various modifications to the embodiment will be readily apparent to those skilled in the art, and the generic principles defined herein may be applied to other embodiments without the use of inventive faculty. Therefore, the present invention is not intended to be limited to the embodiment described herein but is to be accorded the widest scope as defined by the claims.

What is claimed is:

1. A multiple angle reproduction method for reproducing picture data of multiple angles in a recording medium, comprising the steps of:

(a) determining whether an instruction for a multiple angle reproduction mode is input;

(b) reproducing data of a first angle recorded in the recording medium; and (c) automatically sequencing to a second angle and reproducing data of the second angle if it is determined that the instruction for the multiple angle reproduction mode is input in said step (a).

2. A multiple angle reproduction method of claim 1, wherein said step (c) comprises the steps of:

(c1) setting one of the multiple angles other than the first angle as the second angle;

(c2) determining whether reproduction is completed for all of the multiple angles;

(c3) searching for a data block of the second angle if it is not determined that the reproduction is completed for all of the multiple angles in said step (c2);

(c4) reproducing the data block of the second angle; and (c5) changing the second angle to another of the multiple angles when the reproduction of the data block of the second angle is completed.

3. A multiple angle reproduction method for reproducing a picture data of multiple angles in a recording medium, comprising the steps of:

(a) determining whether only a data of a single angle is recorded in the recording medium;

(b) displaying that only the data of a single angle is recorded in the recording medium if it is determined so in said step (a);

(c) determining whether an instruction for a multiple angle reproduction mode is input;

(d) reproducing data of a first angle recorded in the recording medium; and (e) sequentially changing a second angle and reproducing a data of the second angle, if it is determined that the instruction for the multiple angle reproduction mode is input in said step (c), by (e1) setting one of the multiple angles other than the first angle as the second (e2) determining whether the reproduction was completed for all of the multiple angles;

(e3) searching for a data block of the second angle if it is not determined that the reproduction was completed for all of the multiple angles in said step (e2);

(e4) reproducing the data block of the second angle; and (e5) changing the second angle by another angle when the reproduction of the data block of the second angle is completed.

4. A multiple angle reproduction method of claim 3, further comprising a step of displaying that an operation mode is a multiple angle mode when it is determined that the instruction for the multiple angle reproduction mode is input in said step (c1).

5. A multiple angle reproduction method of claim 1, wherein said step (e) comprises a step of displaying on a display device a number of times the second angle has been changed.

6. A multiple angle reproduction method of claim 5, wherein the number of times the angle second angle has been changed is displayed for only a predetermined time whenever the angle is changed.

7. A multiple angle reproduction method of claim 1, further comprising steps of:
- (a0) determining whether only data of a single angle is recorded in the recording medium before said step (a) is performed; and
- (a0') displaying that only the data of a single angle is recorded in the recording medium if it is determined so in said step (a0).

8. A multiple angle reproduction method of claim 1, further comprising a step of displaying that an operation mode is a multiple angle mode when it is determined that the instruction for the multiple angle reproduction mode is input in said step (a).

9. A multiple angle reproduction method of claim 1, wherein said step (c) comprises a step of displaying on a display device a number of times the second angle has been changed.

10. A multiple angle reproduction method of claim 9, wherein the number of times the angle second angle has been changed is displayed for only a predetermined time whenever the angle is changed.

* * * * *